United States Patent [19]
Tilles

[11] 3,879,455
[45] Apr. 22, 1975

[54] HERBICIDE COMPOSITIONS
[75] Inventor: Harry Tilles, El Cerrito, Calif.
[73] Assignee: Stauffer Chemical Company, Westport, Conn.
[22] Filed: Aug. 14, 1972
[21] Appl. No.: 280,389

[52] U.S. Cl.............. 260/551 R; 71/98; 260/455 A; 260/607 A
[51] Int. Cl............................................ C07c 103/00
[58] Field of Search........................ 260/551, 455 A

[56] References Cited
UNITED STATES PATENTS
3,598,859  8/1971  Yates et al........................... 260/558

*Primary Examiner*—Harry I. Moatz
*Attorney, Agent, or Firm*—Daniel C. Block

[57] ABSTRACT

Herbicidally active sulfoxide compounds are described herein. The compounds have the following generic formula:

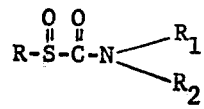

wherein R and $R_1$ are lower alkyl; and $R_2$ can be selected from the group consisting of phenyl and benzyl.

3 Claims, No Drawings

HERBICIDE COMPOSITIONS

Description of the Invention

This invention is directed to a novel group of compounds which may be generally described as sulfoxide derivatives of thiocarbamates which are highly active herbicides. The compounds of the present invention are represented by the generic formula:

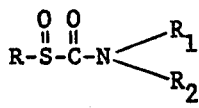

wherein R and $R_1$ can be lower alkyl; $R_2$ can be selected from the group consisting of phenyl and benzyl.

The above-noted compounds can be prepared by reacting an oxidizing agent such as peracetic acid and m-chloroperoxybenzoic acid with a thiocarbamate compound corresponding to the following formula:

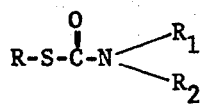

wherein R, $R_1$ and $R_2$ have been defined above. The reaction is carried out in the presence of a solvent such as chloroform, methylene chloride, benzene and toluene, and at a reduced temperature of from about −25°C. to about 25°C. The amount of oxidizing agent used must be at least one molar equivalent to form the sulfoxide derivative. The reaction is complete when no oxidizing agent remains.

The thiocarbamate compounds are known herbicides and their method of synthesis is known; see U.S. Pat. Nos. 2,913,327, 2,983,747, 3,133,947, 3,175,897 and 3,185,720 for example. However, the use of these thiocarbamates as reactive intermediates to form other compounds that also have pesticidal activity is unexpected.

In order to illustrate the merits of the present invention the following examples are provided:

Example 1

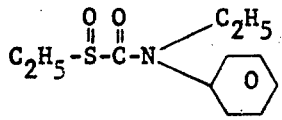

A solution was formed containing 10.5 g. (0.05 mole) of S-ethyl N-ethylphenylthiocarbamate in 200 cc. of methylene chloride in a reaction vessel. This solution was cooled to −15.5°C., wherein 10.7 g (0.0525 mole) of m-chloroperoxybenzoic acid was added over a period of six minutes. The reaction mass was maintained at this temperature for an additional one hour, wherein the temperature was allowed to go to 5.5°C. for another one-half hour. Thereafter, the reaction mass was allowed to obtain a temperature of 19.5°C., wherein the cold mixture was filtered and the cake was washed with two portions of 25 cc. of methylene chloride. The combined filtrate was washed with four portions of 100 cc. of 5 percent sodium carbonate solution and two portions of 100 cc. of water, dried over magnesium sulfate and concentrated in a rotary evaporator, first under water pump vacuum and finally under high vacuum, to yield 9.8 g. of product, $n_D^{30}$ - 1.560.

Other compounds were prepared in an analogous manner starting with the appropriate starting materials as outlined above. The following is a table of compounds representative of those embodied by the present invention. Compound numbers have been assigned to them are used for identification throughout the balance of the specification.

TABLE I

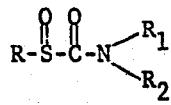

| Compound No. | R | $R_1$ | $R_2$ |
|---|---|---|---|
| 1 | $-C_2H_5$ | $-C_2H_5$ |  |
| 2 | $-C_2H_5$ | $-C_2H_5$ |  |

Herbicidal Screening Tests

As previously mentioned, the novel compounds herein described are phytotoxic compounds which are useful and valuable in controlling various plants species. Compounds of this innvention are tested as herbicides in the following manner.

Pre-emergence Herbicide Screening Test

Using an analytical balance, 20 mg. of the compound to be tested is weighed out on a piece of glassine weighing paper. The paper and compound are placed in a 30 ml. wide-mouth bottle and 3 ml. of aceton containing 1 percent Tween 20 is added to dissolve the compound. If the material is not soluble in acetone, another solvent such as water, alcohol or dimethylformamide (DMF) is used instead. When DMF is used, only 0.5 ml. or less is used to dissolve the compound and then another solvent is used to make the volume up to 3 ml. The 3 ml. of solution is sprayed uniformly on the soil contained in a small Styrofoam flat one day after planting weed seeds in the flat of soil. A No. 152 DeVilbiss atomizer is used to apply the spray using compressed air at a pressure of 5 lb./sq. in. The rate of application is 8 lb./acre and the spray volume is 143 gal./acre.

On the day preceding treatment, the Styrofoam flat, which is 7 inches long, 5 inches wide and 2.75 inches deep, is filled to a depth of 2 inches with loamy sand soil. Seeds of seven different weed species are planted in individual rows using one species per row across the width of the flat. The seeds are covered with soil so that they are planted at a depth of 0.5 inch. The seeds used are hairy crabgrass (*Digitaria sanguinalis*), yellow foxtail (*Setaria glauca*), watergrass (*Echinocholoa crus-*

*galli*), red oat (*Avena sativa*), redroot pigweed (*Amaranthus retroflexus*), Indian mustard (*Brassica juncea*) and curly dock (*Rumex crispus*). Ample seeds are planted to give about 20 to 50 seedlings per row after emergence depending on the size of the plants.

After treatment, the flats are placed in the greenhouse at a temperature of 70° to 85°F. and watered by sprinkling. Two weeks after treatment the degree of injury or control is determined by comparison with untreated check plants of the same age. The injury rating from 0 to 100 percent is recorded for each species as percent control with 0 percent representing no injury and 100 percent representing complete kill.

POST-EMERGENCE HERBICIDE SCREENING TEST

Seeds of six plant species, including hairy crabgrass, watergrass, red oat, mustard, curly dock and Pinto beans (*Phaseolus vulgaris*) are planted in the Styrofoam flats as described above for pre-emergence screening. The flats are placed in the greenhouse at 70° to 85°F. and watered daily with a sprinkler. About 10 to 14 days after planting when the primary leaves of the bean plants are almost fully expanded and the first trifoliate leaves are just starting to form, the plants are sprayed. The spray is prepared by weighing out 20 mg. of the test compound, dissolving it in 5 ml. of acetone containing 1 percent Tween 20 and then adding 5 ml. of water. The solution is sprayed on the foliage using a No. 152 DeVilbiss atomizer at an air pressure of 5 lb./sq. inch. The spray concentration is 0.2 percent and the rate is 8 lb./acre. The spray volume is 476 gal./acre.

Injury ratings are recorded 14 days after treatment. The rating system is the same as described above for the preemergence test.

The results of these tests are shown in Table II.

TABLE II

HERBICIDAL ACTIVITY - SCREENING RESULTS

| Compound Number | Per Cent Control* at 8 lb./A | |
|---|---|---|
| | Pre-emergence | Post-emergence |
| 1 | 24 | 20 |
| 2 | 90 | 78 |

*Average for seven plant species in the pre-emergence test and for six plant species in the post-emergence test.

What is claimed is:

1. A compound represented by the following generic formula:

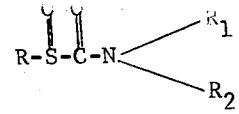

wherein R and $R_1$ are lower alkyl; $R_2$ is selected from the group consisting of phenyl and benzyl.

2. The compound as set forth in claim 1 wherein R is —$C_2H_5$,

3. The compound as set forth in claim 1 wherein R is —$C_2H_5$,

* * * * *

UNITED STATES PATENT OFFICE
CERTIFICATE OF CORRECTION

Patent No. 3,879,455          Dated April 22, 1975

Inventor(s) Harry Tilles

It is certified that error appears in the above-identified patent and that said Letters Patent are hereby corrected as shown below:

Column 2, line 46, "aceton" should read -- acetone --.

Column 4, Claim 2, the definition of R reading "$-C_2H_5$, $-C_2H_5$" should read -- $-C_2H_5$, --.

Column 4, Claim 3, the definition of R reading "$-C_2H_5$, $-C_2H_5$" should read -- $-C_2H_5$, --.

Signed and Sealed

Fifteenth Day of March 1977

[SEAL]

Attest:

RUTH C. MASON
Attesting Officer

C. MARSHALL DANN
Commissioner of Patents and Trademarks